(12) United States Patent
Benkual et al.

(10) Patent No.: US 6,170,003 B1
(45) Date of Patent: Jan. 2, 2001

(54) APPARATUS AND METHOD FOR COMMUNICATING MESSAGES BETWEEN DATA PROCESSING NODES USING REMOTE READING OF MESSAGE QUEUES

(75) Inventors: Jack Benkual, Lake Forest, CA (US); Ian Gregory Colloff, Ascot (GB); Allen Harold Brumm, Laguna Niguel, CA (US)

(73) Assignee: International Computers Limited, London (GB)

(*) Notice: Under 35 U.S.C. 154(b), the term of this patent shall be extended for 0 days.

(21) Appl. No.: 08/104,819

(22) Filed: Aug. 10, 1993

(51) Int. Cl.[7] .................................................. G06F 15/16
(52) U.S. Cl. ............................................. 709/214; 709/218
(58) Field of Search ................................... 395/800, 425, 395/600, 200; 709/213–219, 300; 710/52–53, 56

(56) References Cited

U.S. PATENT DOCUMENTS

| | | | |
|---|---|---|---|
| 5,020,020 | * 5/1991 | Pomfret et al. | 395/200 |
| 5,089,958 | * 2/1992 | Horton et al. | 395/575 |
| 5,317,715 | * 5/1994 | Johnson et al. | 395/425 |
| 5,329,619 | * 7/1994 | Pagé et al. | 395/200 |

* cited by examiner

*Primary Examiner*—John W. Cabeca
*Assistant Examiner*—Denise Tran
(74) *Attorney, Agent, or Firm*—Lee, Mann, Smith, McWilliams, Sweeney & Ohlson

(57) ABSTRACT

A multi-nodal data processing system in which each node has a local memory for storing message send vectors, one for each other node in the system. When a node has a message to send, it places the message in the message send vector corresponding to the destination node of that message. When a node is ready to receive messages, it reads messages from the message send vectors corresponding to this node in the other nodes. Each message send vector has a head pointer and a tail pointer for defining the head and tail of a queue of messages. Each tail pointer is held locally, in the same node as the message send vector to which it relates, while the head pointer is held in the destination node of that message send vector.

6 Claims, 4 Drawing Sheets

APPARATUS AND METHOD FOR COMMUNICATING MESSAGES BETWEEN DATA PROCESSING NODES USING REMOTE READING OF MESSAGE QUEUES

BACKGROUND TO THE INVENTION

This invention relates to multi-nodal data processing systems. More specifically the invention is concerned with providing a mechanism for communicating messages between the nodes of such a system.

One way of communicating messages between nodes is for the sending node to transmit the messages to the receiving node over an inter-node network. A problem with this, however, is that the receiving node may become overloaded with messages received from other nodes, and as a result messages may be lost.

An object of the present invention is to provide an improved message passing mechanism that does not suffer from this problem.

SUMMARY OF THE INVENTION

According to the invention there is provided a data processing system comprising a plurality of data processing nodes, wherein each node comprises:

(a) local memory means for storing a plurality of message send vectors, one for each other node in the system, (b) message send means for placing messages in said message send vectors, each message being placed in the message send vector corresponding to the destination node of that message, and (c) message receive means for reading messages from the message send vectors corresponding to this node in the other nodes.

DESCRIPTION OF AN EMBODIMENT OF THE INVENTION

One embodiment of the invention will now be described by way of example with reference to the accompanying drawings.

Figure 1:
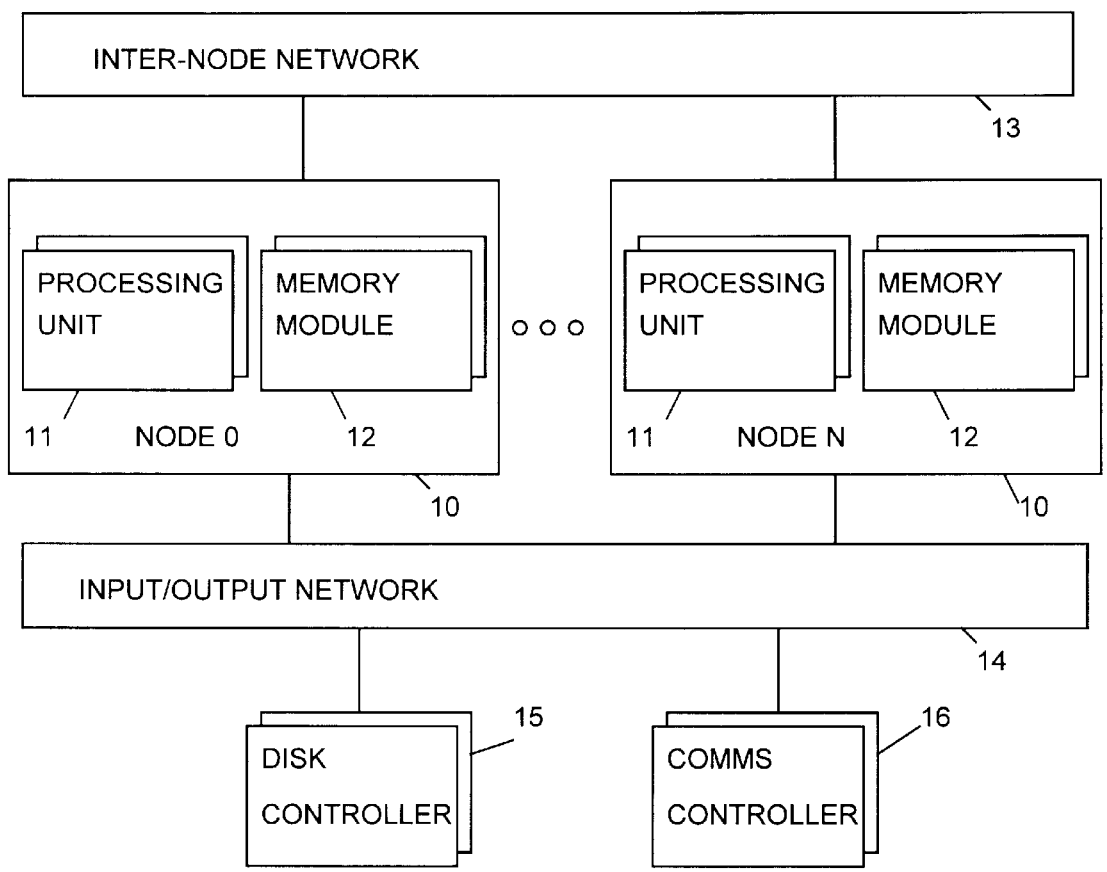
FIGS. 1 and 2A is a block diagram of a multi-nodal data processing system including a message passing mechanism in accordance with the invention.

Referring to FIG. 1, the system comprises a plurality of data processing nodes 10. Each node includes one or more data processing elements 11, and one or more local memory modules 12.

The nodes are interconnected by an inter-node network 13, which allows the nodes to send messages to each other. The nodes are also all connected to an input/output (I/O) network 14, which allows the nodes to access a number of disk controllers 15 and communications controllers 16.

Figure 2:
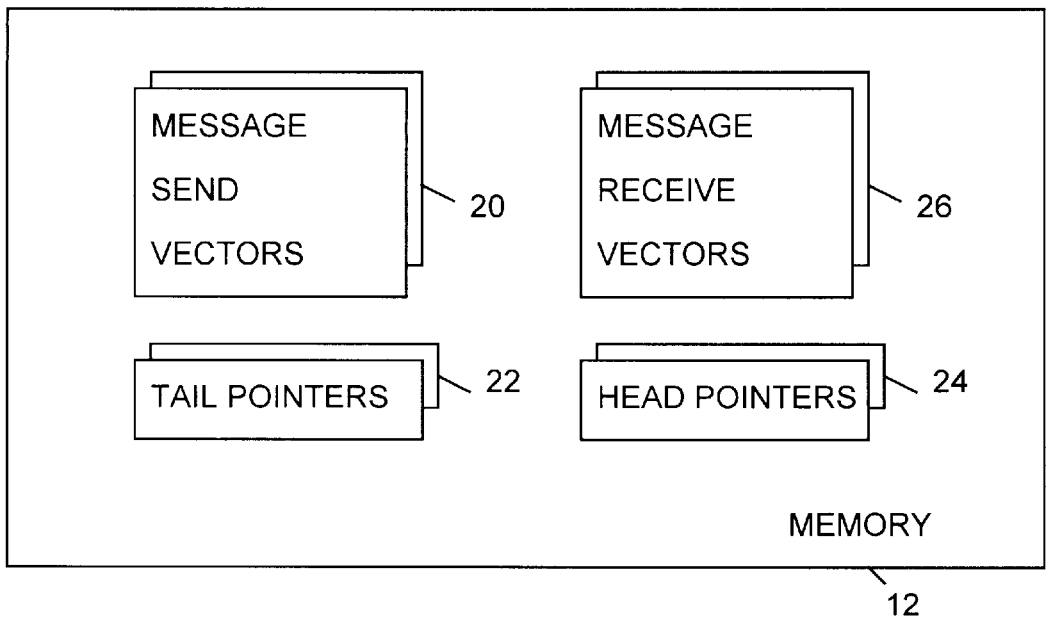
FIG. 2 is a schematic block diagram showing data structures used by the message passing mechanism.
Figure 2A:
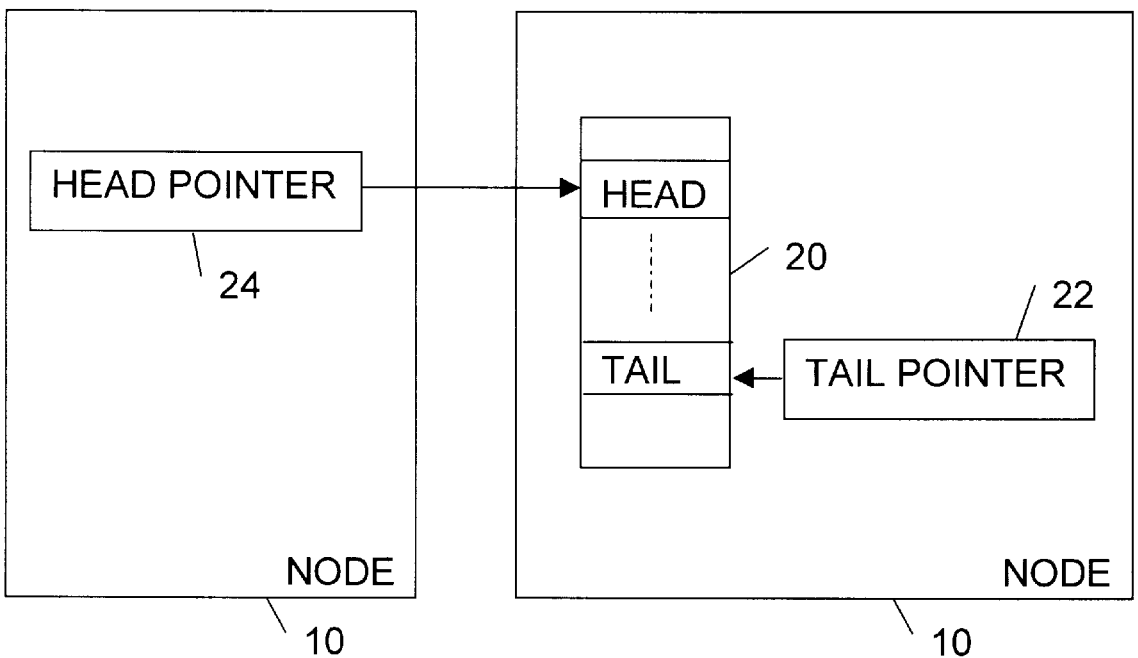

Referring now to FIG. 2, the local memory 12 in each node contains a number of message send vectors 20, held in predetermined locations of the memory. Each vector contains a number of message slots, for holding a queue of messages for a particular one of the other nodes. Thus, message send vector j in node i holds messages from node i for node j. The message size is fixed, and is preferably a multiple of the cache line size of the system. For example, if the cache line size is 32 bytes, the message size may typically be 128 or 256 bytes. The messages are aligned with the cache lines. Each message has a checksum value associated with it, for detecting transmission errors.

Each message send vector 20 has a tail pointer 22 associated with it, pointing to the next available message slot in this vector, and a head pointer 24, pointing to the first message queued in this vector. The tail pointer is held locally; that is, each tail pointer is held in the same local memory as the message send vector to which it relates. The head pointers, on the other hand, are held remotely; that is, each head pointer is held in the local memory of the destination node of the messages in the message send vector. Thus, head pointer j in node i points to the first available message in message send vector i of node j.

The local memory in each node also holds message receive vectors 26. These are used, as will be described, to hold local copies of messages received from the other nodes.

Figure 3:
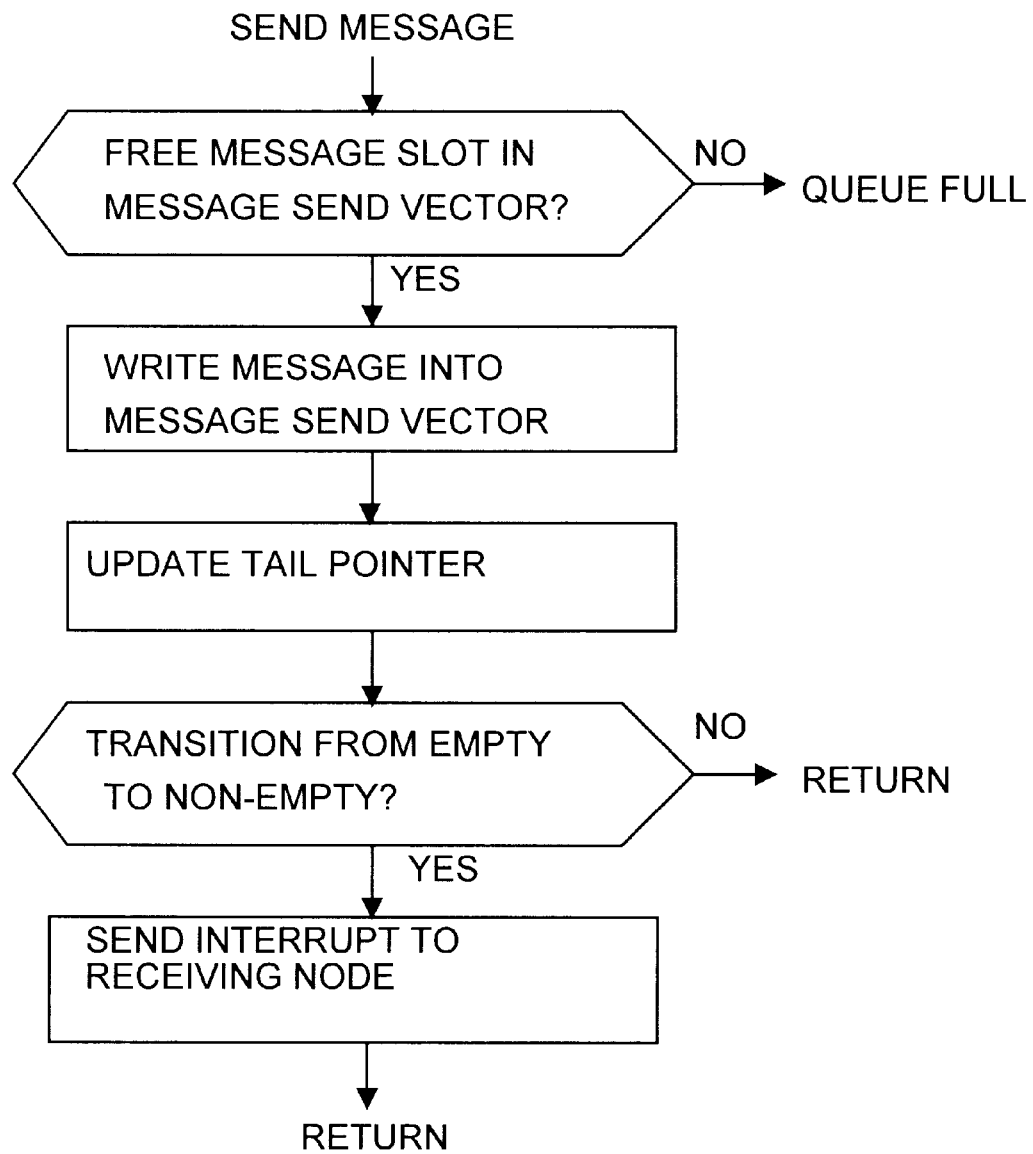
FIG. 3 is a flow chart showing the operation of the message passing mechanism in one node when it requires to pass a message to another node.

Referring now to FIG. 3, when a node (node i) has a message for sending to another node (node j), it performs the following actions. First, node i checks whether there is a free message slot in message send vector j in its local memory, by comparing the head and tail pointers for that vector. Assuming that there is at least one free message slot, node i writes the message into the first available message slot in the message send vector, as indicated by the tail pointer. Then, node i updates the tail pointer, ie increments it by one. (Each message send vector is organized as a circular queue, so that incrementing the head or tail pointer beyond the end of the vector returns it to the start of the vector). Finally, node i checks whether the queue has just changed from being empty to being non-empty, ie whether there is now exactly one message in the queue. If so, an interrupt signal is sent to node j to inform it that a message is now available for it to read.

Figure 4:
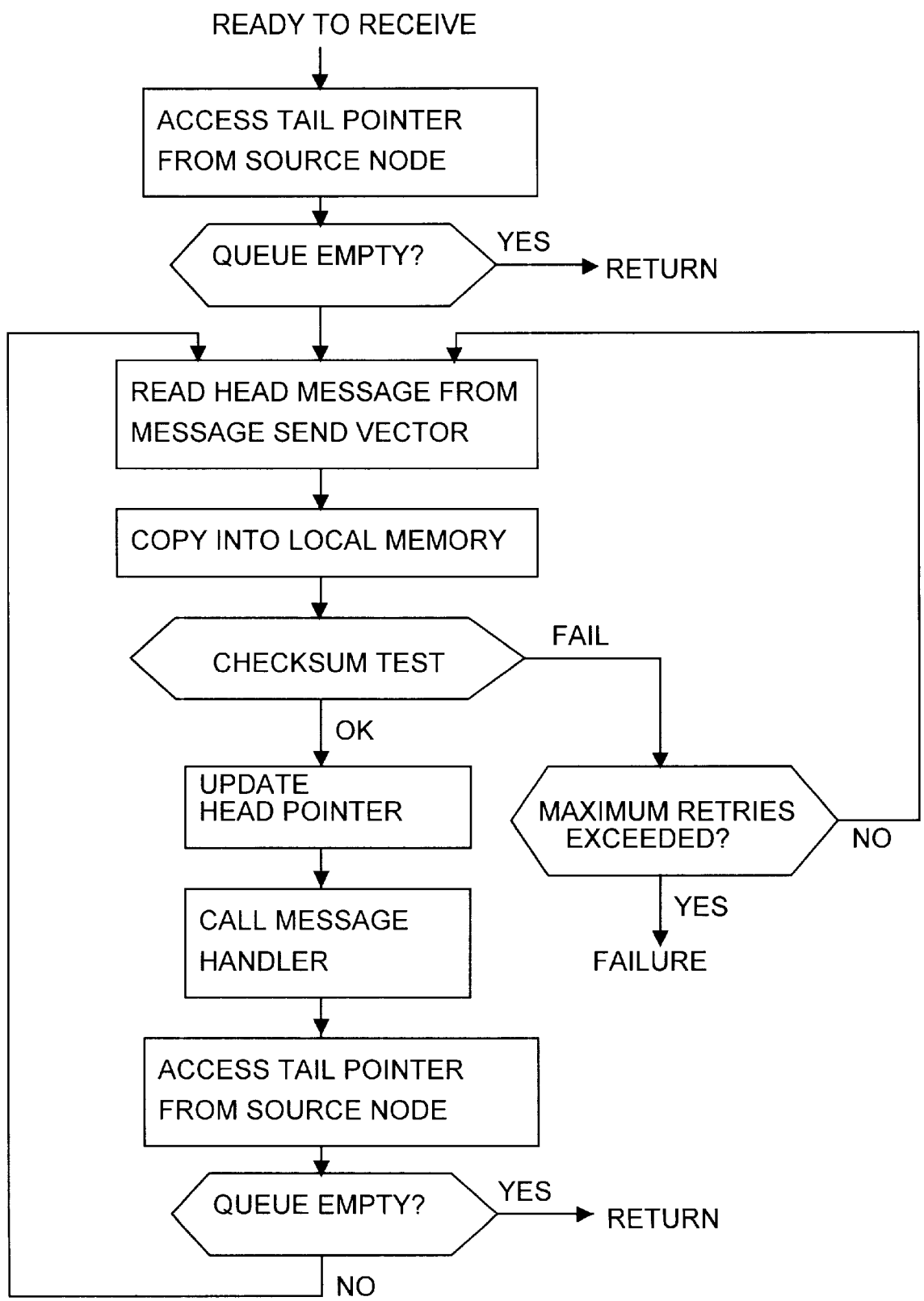
FIG. 4 is a flow chart showing the operation of the message passing mechanism in one node when it is ready to receive a message from another node.

Referring now to FIG. 4, when a node (node j) is ready to receive a message from node i, it performs the following actions. First, node j performs a remote read of the memory in node i, so as to read the value of tail pointer for message send vector j in node i. Node j then compares this tail pointer value with the corresponding head pointer for that vector, which is held in its local memory, to see whether that vector contains any messages. If the head pointer value is not equal to the tail pointer value, this means that there is at least one message for node j in message send vector j of node i. Node j therefore proceeds to process all outstanding messages in the queue as follows.

Node j performs a remote read of the memory in node i, so as to read the first queued message from message vector j of that node, ie the message pointed to by the head pointer. The message is copied into the message receive vector in node j corresponding to node i. Node j then performs a checksum test on the message, to see whether the message has been correctly received. If the checksum test fails, node j makes another attempt to copy the message from node i. If the failure still persists after a predetermined number of retries, the system is shut down. Assuming that the checksum test is correct, node j updates the head pointer of message send vector i in its local memory (ie increments it by one), so as to point to the next queued message. An appropriate message handler is then called, to process the current message.

The steps described in the preceding paragraph are repeated until it is found that the head and tail pointers are equal, indicating that the queue is now empty, ie there are no more messages waiting to be processed.

In summary, it can be seen that the message passing mechanism described above allows messages to be passed between nodes without the necessity for any writes to each other's local memories. When a node has a message to send, it simply writes the message to the appropriate message send vector in its local memory, and this message will then be read by the destination node, using a remote memory read.

We claim:

1. A data processing system comprising:
   (a) a first data processing node, including first memory means for holding a first queue of messages,
   (b) a second data processing node, including second memory means for holding a second queue of messages, and
   (c) an inter-node network interconnecting said first data processing node to said second data processing node,
   (d) said first data processing node further comprising:
      (i) first message send means for writing messages, destined for said second data processing node, into said first queue of messages, and
      (ii) first message receive means for performing remote reads of said second memory means, by way of said inter-node network, to read messages from said second queue of messages,
   (e) and said second data processing node further comprising:
      (i) second message send means for writing messages, destined for said first data processing node, into said second queue of messages, and
      (ii) second message receive means for performing remote reads of said first memory means, by way of said inter-node network, to read messages from said first queue of messages.

2. A data processing system comprising:
   (a) a first data processing node, including first memory means for holding a first queue of messages,
   (b) a second data processing node, including second memory means for holding a second queue of messages, and
   (c) an inter-node network interconnecting said first data processing node to said second data processing node,
   (d) said first data processing node further comprising:
      (i) first tail pointer means for pointing to a tail location in said first queue of messages,
      (ii) first head pointer means for pointing to a head location in said second queue of messages,
      (iii) first message send means for using said first tail pointer means to write a message, destined for said second data processing node, into said tail location in said first queue of messages, and
      (iv) first message receive means for performing a remote read of said second memory means, by way of said inter-node network, using said first head pointer means, to read a message from said head location in said second queue of messages, and
   (e) said second data processing node further comprising:
      (i) second tail pointer means for pointing to a tail location in said second queue of messages,
      (ii) second head pointer means for pointing to a head location in said first queue of messages,
      (iii) second message send means for using said second tail pointer means to write a message, destined for said first data processing node, into said tail location in said second queue of messages, and
      (iv) second message receive means for performing a remote read of said first memory means, by way of said inter-node network, using said second head pointer means, to read a message from said head location in said first queue of messages.

3. A data processing system comprising:
   (a) a first data processing node,
   (b) a plurality of further data processing nodes, and
   (c) an inter-node network interconnecting said first data processing node to each of said further data processing nodes,
   (d) said first data processing node comprising:
      (i) memory means for holding a plurality of queues of messages, said queues of messages being respectively associated with said further data processing nodes, and
      (ii) message send means for writing messages, destined for said further data processing nodes, into respective ones of said queues of messages,
   (e) and each of said further data processing nodes comprising message receive means for performing remote reads of said memory means, by way of said inter-node network, to read messages from a respective one of said queues of messages.

4. A data processing system comprising:
   (a) a first data processing node,
   (b) a plurality of further data processing nodes, and
   (c) an inter-node network interconnecting said first data processing node to each of said further data processing nodes,
   (d) said first data processing node comprising:
      (i) memory means for holding a plurality of queues of messages, said queues of messages being respectively associated with said further data processing nodes,
      (ii) tail pointer means for pointing to tail locations in said queues of messages, and
      (ii) message send means for using said tail pointer means to write messages, destined for said further data processing nodes, into said tail locations of respective ones of said queues of messages,
   (e) and each of said further data processing nodes comprising:
      (i) head pointer means for pointing to a head location in each of said queues of messages, and
      (ii) message receive means for performing remote reads of said memory means, by way of said inter-node network, using said head pointer means, to read messages from said head location in said respective one of said queues of messages.

5. A method of operating a data processing system comprising a first data processing node, including first memory means for holding a first queue of messages, a second data processing node, including second memory means for holding a second queue of messages, and an inter-node network interconnecting said first data processing node to said second data processing node, said method comprising the steps:
   (i) operating said first data processing node to write messages, destined for said second data processing node, into said first queue of messages,
   (ii) operating said first data processing node to perform remote reads of said second memory means, by way of said inter-node network to read messages from said second queue of messages, (iii) operating said second data processing node to write messages, destined for said first data processing node, into said second queue of messages, and (iv) operating said second data processing node to perform remote reads of said first memory means, by way of said inter-node network, to read messages from said first queue of messages.

6. A method of operating a data processing system comprising a first data processing node, including memory means for holding a plurality of queues of messages, a plurality of further data processing nodes, each of said further data processing nodes being associated with a respective one of said queues of messages, and an inter-node network interconnecting said first data processing node to each of said plurality of further data processing nodes, said method comprising the steps:

(i) operating said first data processing node to write messages, destined for said further data processing nodes, into respective ones of said queues of messages, and (ii) operating said further data processing nodes to perform remote reads of said memory means, by way of said inter-node network, to read messages from respective ones of said queues of messages.

\* \* \* \* \*